US010888048B2

(12) United States Patent
Kappelman et al.

(10) Patent No.: US 10,888,048 B2
(45) Date of Patent: Jan. 12, 2021

(54) MATERIAL WRAP SYSTEM WITH SELF CLEANING FEATURE

(71) Applicant: Deere & Company, Moline, IL (US)

(72) Inventors: Jacob D. Kappelman, Bloomfield, IA (US); Jennifer R. Horner, Earlham, IA (US); Henry D. Anstey, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 212 days.

(21) Appl. No.: 15/922,573

(22) Filed: Mar. 15, 2018

(65) Prior Publication Data

US 2019/0281766 A1 Sep. 19, 2019

(51) Int. Cl.
*A01F 15/07* (2006.01)
*A01D 75/18* (2006.01)
(Continued)

(52) U.S. Cl.
CPC ........ *A01F 15/0715* (2013.01); *A01D 75/187* (2013.01); *A01F 15/10* (2013.01);
(Continued)

(58) Field of Classification Search
CPC ...... A01F 15/0715; A01F 15/10; A01F 15/18; A01F 2015/076; A01F 2015/077; A01F 2015/108; A01F 15/077; A01F 15/07; A01F 15/071; A01F 15/08; A01F 2015/078; A01D 75/187; B65B 11/56; B65B 45/00; B65B 45/18; B65B 11/04; B65B 55/24; B65B 55/20; B65B 63/04; B65G 45/18
(Continued)

(56) References Cited

U.S. PATENT DOCUMENTS

| | | | | |
|---|---|---|---|---|
| 2,218,674 A | * | 10/1940 | Eaton | B24B 19/223 451/67 |
| 2,403,374 A | * | 7/1946 | Kalmar | A23N 12/005 198/495 |
| 4,896,477 A | * | 1/1990 | Wagstaff | A01F 15/0715 53/118 |
| 5,129,208 A | * | 7/1992 | Van Zee | A01F 15/0715 53/118 |
| 5,433,059 A | * | 7/1995 | Kluver | A01F 15/0715 53/118 |

(Continued)

FOREIGN PATENT DOCUMENTS

| | | |
|---|---|---|
| DE | 19539297 C1 | 4/1997 |
| EP | 1099367 A1 | 5/2001 |
| WO | 2014129891 A1 | 8/2014 |

OTHER PUBLICATIONS

European Search Report issued in counterpart application No. 19162290.1 dated Jul. 30, 2019. (7 pages).

*Primary Examiner* — Thanh K Truong
*Assistant Examiner* — Scott A Howell
(74) *Attorney, Agent, or Firm* — Klintworth & Rozenblat IP LLP (57) ABSTRACT

A system for wrapping a material around a bale in a baler includes a feed system to direct the material through a feed path. A knife mechanism with a fixed knife and a counter-knife alternately cuts the material, and moves out of the feed path for feed of the material. The feed system includes a roll element configured to direct the material between the fixed knife and the counter-knife when the counter-knife is moved out of the feed path. A cylindrical brush rotates freely and is disposed between the roll element and the knife mechanism, the brush having a cylindrical shape. The brush is configured to remove debris when rotated.

15 Claims, 6 Drawing Sheets

(51) Int. Cl.
*A01F 15/10* (2006.01)
*A01F 15/18* (2006.01)
*B65B 11/56* (2006.01)
*B65G 45/18* (2006.01)
*B65B 45/00* (2006.01)

(52) U.S. Cl.
CPC .............. *A01F 15/18* (2013.01); *B65B 11/56* (2013.01); *B65G 45/18* (2013.01); *A01F 2015/076* (2013.01); *A01F 2015/077* (2013.01); *A01F 2015/108* (2013.01); *B65B 45/00* (2013.01)

(58) Field of Classification Search
USPC ............ 53/389.3, 116, 118, 587, 288, 389.1, 53/389.2, 393, 167, 341; 100/5, 87, 88, 100/89
See application file for complete search history.

(56) References Cited

U.S. PATENT DOCUMENTS

| | | | | |
|---|---|---|---|---|
| 5,692,365 | A * | 12/1997 | Meyer | A01F 15/0715 53/389.3 |
| 6,006,504 | A * | 12/1999 | Myers | A01F 15/0715 53/556 |
| 6,272,816 | B1 * | 8/2001 | Viaud | A01F 15/0715 242/441.4 |
| 6,622,463 | B1 | 9/2003 | Anstey et al. | |
| 6,722,100 | B1 * | 4/2004 | Underhill | A01F 15/0715 53/118 |
| 7,513,088 | B2 * | 4/2009 | Vande Ryse | A01F 15/0715 53/118 |
| 7,946,095 | B2 * | 5/2011 | Olander | A01F 15/0715 53/118 |
| 9,016,032 | B2 * | 4/2015 | Chapon | A01F 15/0715 53/203 |

* cited by examiner

MATERIAL WRAP SYSTEM WITH SELF CLEANING FEATURE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to material wrap systems and more particularly to systems for wrapping crop packages, including the wrapping of bales of crop material formed in round balers.

BACKGROUND OF THE DISCLOSURE

In agricultural and other applications, it may be useful to wrap aggregated packages with a wrap material. For example, certain types of wrap material help hold crop packages together and can protect crop packages from environmental elements such as rain and other moisture sources.

Round balers aggregate cut material into a bale package and are typically equipped with a material wrapping system. These systems apply a material such as netting, mesh, film or sheet, to hold the bale in a compressed round shape for storage and transport. In conventional baling systems, the interaction between feeding and cutting of the wrap material uses a complex mechanical system that cuts the wrap material leaving a loose end that must be accurately fed through the baler in a challenging and active environment with dust and cutting debris. Accordingly, a system that delivers consistent and accurate feed of the material, with reduced down-time, would be beneficial.

SUMMARY OF THE DISCLOSURE

A material wrap system for wrapping a material around a bale in a baler is disclosed. According to one aspect of the disclosure, a system includes a feed system to direct the material through a feed path. A knife mechanism with a fixed knife and a counter-knife alternately cuts the material, and then moves out of the feed path for feed of the material. The feed system includes a roll element configured to direct the material between the fixed knife and the counter-knife, when the counter-knife is moved out of the feed path. A cylindrical brush rotates freely and is disposed between the roll element and the knife mechanism. The brush is configured to remove debris when rotated.

In another aspect, a system for wrapping a material includes a feed system to direct the material through a feed path. The feed system includes a roll element. A knife mechanism intersects the feed path to cut the material forming a cut end. The knife mechanism is spaced apart from the roll element a distance through which the cut end is fed by the feed system. A brush is disposed between the roll element and the knife mechanism. The brush has bristles formed in a cylindrical shape. The brush rotates intermittently when the knife mechanism cuts the material, and directs the cut end through the knife mechanism when the material is fed by the feed system.

In additional aspects, a system for wrapping a material includes a feed roll that intermittently feeds the material. A roll element receives the material from the feed roll and directs the material through a feed path. A knife mechanism intersects the feed path to cut the material, and moves out of the feed path for feed of the material. A brush is disposed between the roll element and the knife mechanism. The brush extends adjacent to, and along, the roll element. The brush has bristles formed in a cylindrical shape and rotates intermittently when the knife mechanism intersects the feed path to clean the brush and the roll element. The brush directs the material from the roll element and through the knife mechanism during feed of the material by the feed roll.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed material wrap system, as shown in the accompanying figures of the drawings described briefly above. Various modifications to the example embodiments may be contemplated by one of skill in the art.

In one or more example implementations of the disclosed material wrap system, a rotating cylindrical brush is disposed between the material feed rolls of a baler and the knife mechanism of the baler. The material wrap system wraps a material around formed bales. The brush helps guide the material through its feed path when a wrap cycle is initiated, such as after a cutting operation. The brush may trap the cut end of the material to hold it in position for the next feed cycle. In addition, the brush rotates when contacted by the moving material and/or the knife for self-cleaning functions.

Figure 1:
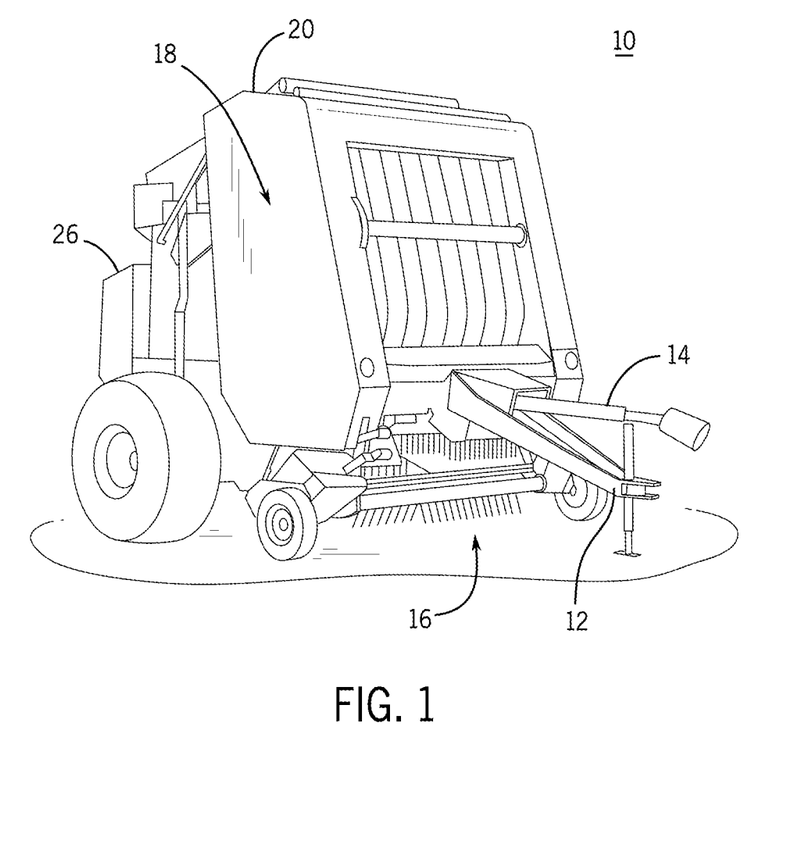
FIG. 1 is a perspective view of an agricultural baler with which the disclosed system is used.

FIG. 1 illustrates an example round baler 10 for forming crop packages configured as round bales. Various examples described herein may present the disclosed material wrap system with respect to the baler 10 and the formation and wrapping of round bales. It will be understood, however, that the baler 10 is presented as an example only, and that the disclosed system may be applied with respect to other round balers, other crop-packaging devices with corresponding crop package types, or various other machinery where wrapping or feeding of a material is used.

In the example illustrated in FIG. 1, the baler 10 includes a tongue 12 so that baler 10 may be towed during operation by a separate vehicle (e.g., an agricultural work vehicle such as a tractor (not shown)). The baler 10, in certain embodiments, may receive power from such a vehicle via a PTO connection 14, which may be connected in various known ways to a PTO shaft of the vehicle (not shown). As the baler 10 moves (e.g., is towed) across a field, cut crop material may be gathered by an intake assembly 16 and guided into a baling chamber 18 within a frame 20 of the baler 10. Within the baling chamber 18, various rollers rotate to move belts (shown in FIG. 2), to rotate and compress the gathered crop material into a generally cylindrical (or "round") bale. Alternatively, various rollers themselves, rather than in conjunction with belts or other devices, may be used to create density and form the bale in what may be referred to as a "fixed chamber baler." Once a bale is formed, it is wrapped with a material to contain and protect the bale during later handling and storage. It will be appreciated that the environment within and around the baler 10 includes complex moving machinery, and is subjected to air movement, cut crop material movement, dust and various debris. As such, the accurate and consistent feed of the light-weight wrapping material is challenging.

Figure 2:
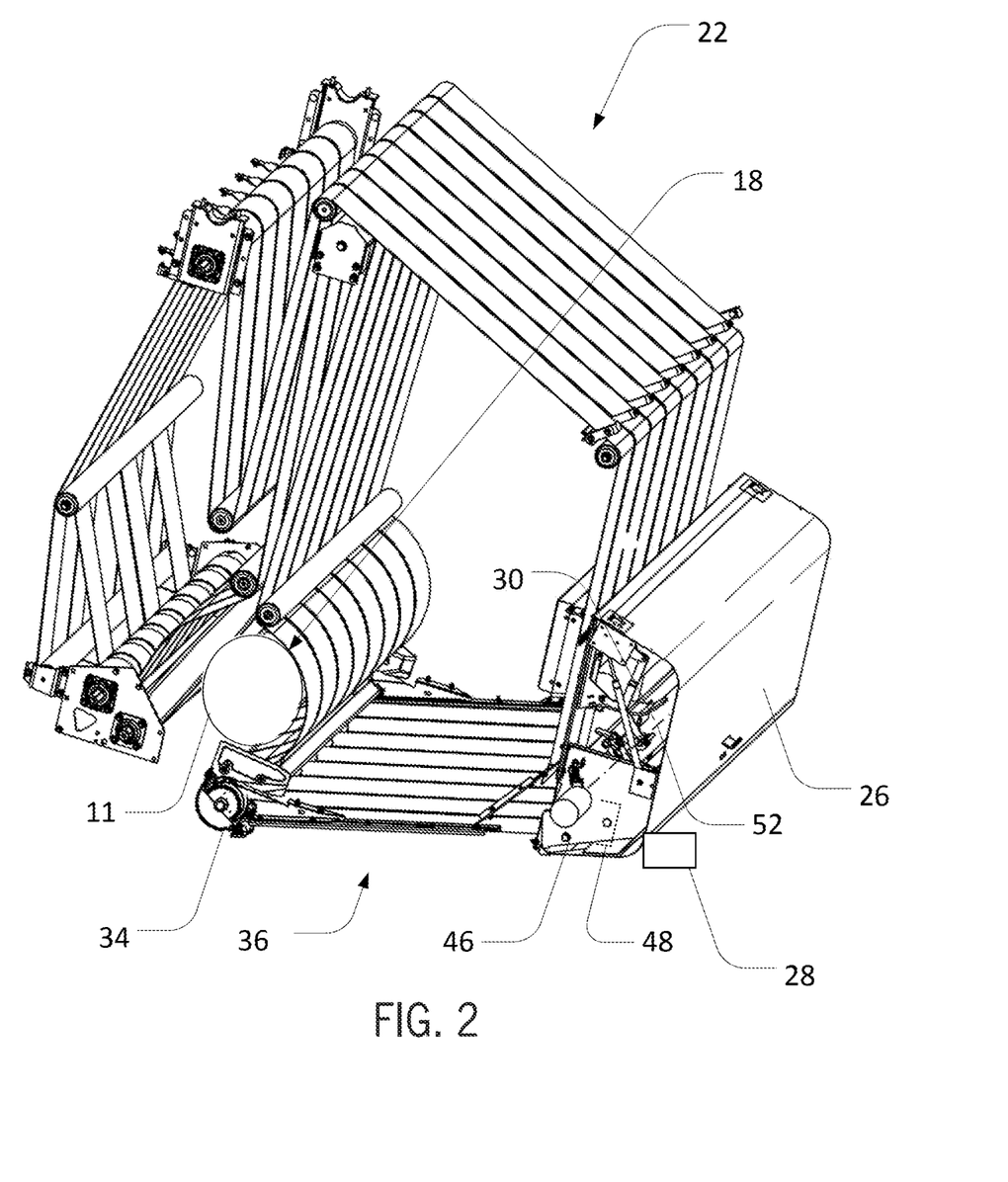
FIG. 2 is a perspective view of certain components of the baler of FIG. 1, including of a material wrap system.

FIG. 2 illustrates certain internal mechanisms of the baler 10, including a belt arrangement 22 for rotating and compressing cut crop material into a round bale 11. In the embodiment illustrated, a material wrap system 24 intermittently feeds material for wrapping the bale 11 formed by the baler 10. A part of the material wrap system 24 may be covered by a rear cover 26, also shown in FIG. 1 for context. It should be noted that components of the material wrap system 24 may be mounted at another location in the baler 10, for example, at the front of the baler 10 or at other locations at the rear of the baler 10, such as a higher or lower location. Also, in other examples, components may be interchanged between the right and left sides of the baler 10. In some embodiments, the rear cover 26 can be opened to load a roll of wrap material (shown in FIG. 3), such as netting wrap. In the current example, the material wrap system 24 includes an electrical motor 46 drawing power from an electrical system of the towing vehicle (or another power source). In other embodiments, other types of motors may be used, including hydraulic motors. Generally, the material wrap system 24 is configured to drive rotation of a feed element for feeding wrap material when needed to wrap a completed bale 11. In the current embodiment, the feed element is a feed roll 30, which may include an elongated roller with a resilient, rubber-like outer surface for engaging the wrap material.

In some embodiments, the baler 10 (or a vehicle towing the baler 10) may include a controller 28, which can include one or more computing devices such as various processor devices and various associated memory architectures. In some embodiments, the controller 28 is in communication with various other devices of the baler 10, of a vehicle towing the baler 10, or of other platforms. As illustrated, the controller 28 is in communication with the material wrap system 24. The controller 28 can also be in communication with various sensors, actuators, or other devices distributed on the baler 10, or elsewhere. For example, the controller 28 may be in communication with rotational sensors on (or otherwise configured to monitor) the feed roll 30, another roller of the baler 10 (e.g., a roller 34 guiding the belt arrangement 22), the PTO connection 14, and other devices. Generally, the controller 28 (or another control device) is used to provide control functions including for moving wrap material through the baler 10 using the feed roll 30 to initiate feed. When the bale 11 is formed within the baling chamber 18 and is ready to be wrapped, the controller 28 operates the material wrap system 24 to draw wrap material from a material roll within the cover 26 onto the feed roll 30. Following the feed roll 30, the material moves through the machinery of the feed system 42 and onto a material feed pan 36 as it moves along a feed path 40, starting from the feed roll 30 to be carried by the belt arrangement 22 to the baling chamber 18 and the bale 11 contained therein.

Figure 3:
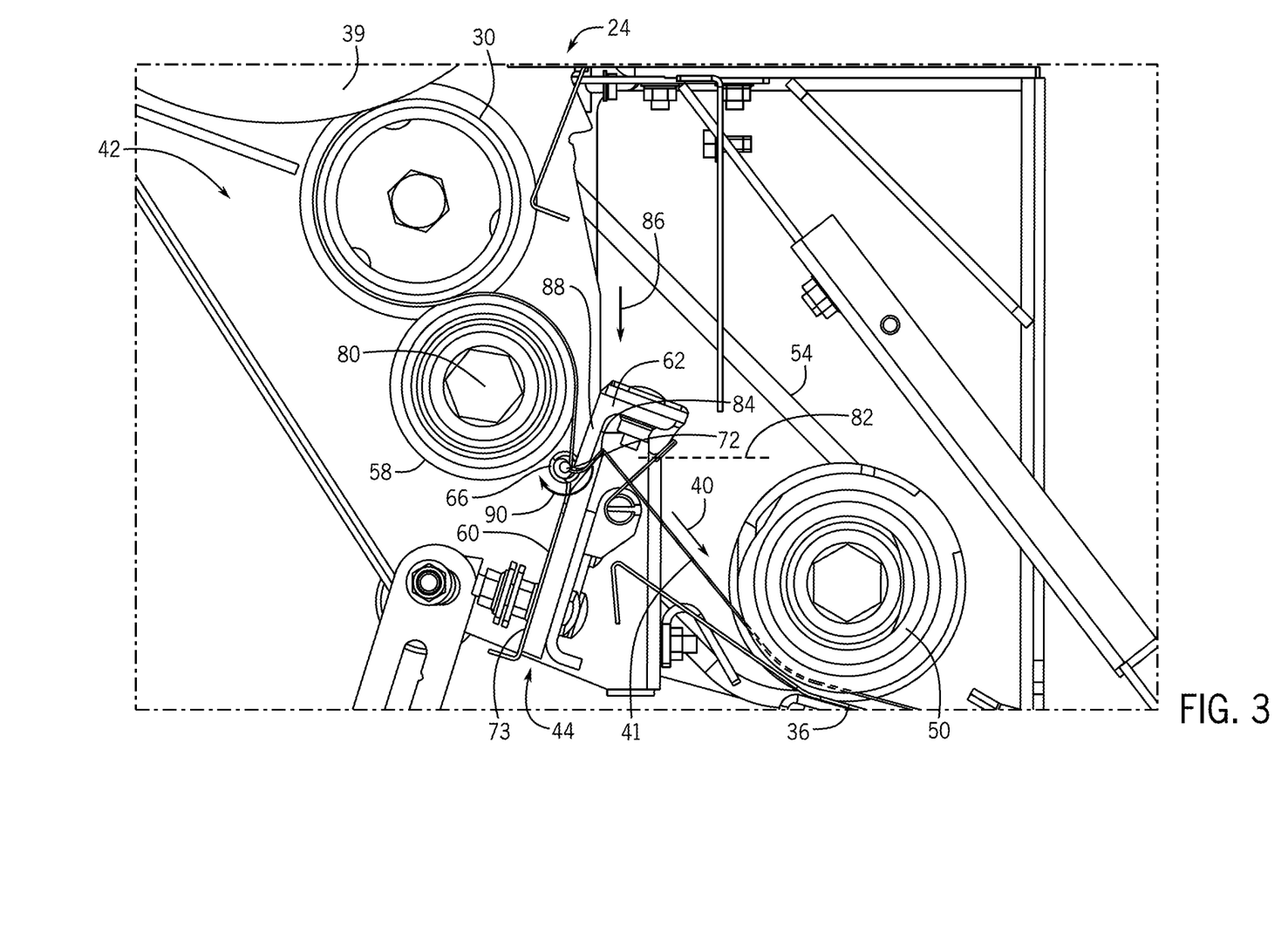
FIG. 3 is a partial end view showing a wrap material feed area within the baler of FIG. 1, with a knife mechanism in a cutting position.

Referring also to FIG. 3, aspects of the material wrap system 24 are shown in greater detail. The material wrap system 24 generally includes a material feed system 42, a knife mechanism 44, the material feed pan 36, and the belt arrangement 22. A material roll 39 is shown loaded in the baler 10 in contact with the feed roll 30. As viewed in FIG. 3 from the right-hand side of the baler 10, material 41 is extracted from the bottom of the material roll 39 as it is rotated in a clockwise direction by the feed roll 30. The material wrap system 24 drives the feed roll 30 counterclockwise (as viewed in FIG. 3) to rotate the material roll 39 in the opposite direction. Material 41 drawn from material roll 39 is fed in a direction of the feed path 40 through the knife mechanism 44 and along the material feed pan 36 toward the baling chamber 18. The belt arrangement 22 helps carry the material 41 through the feed pan 36, into the baling chamber 18, and around the bale 11.

The material feed system 42 includes the feed roll 30, which is driven by a motor 46 (shown on the left side of the baler 10 in FIG. 2) that is operated by the controller 28. The material 41 is fed from the material roll 39 when a bale 11 is fully formed in the baling chamber 18 and a wrapping cycle is initiated. A gearbox 48 (also shown in FIG. 2) is provided to cause the feed roll 30 to rotate at a different speed than the output of the motor 46. The material feed system 42 also includes a drive element embodied as a drive pulley 50. The drive pulley 50 is provided on the right side of the baler 10, and is coupled in the material feed system 42 with the motor 46 through the gearbox 48 and a shaft 52 (shown in FIG. 2), that extends across the baler 10. In other embodiments, the drive element may take other forms of rotating, drive imparting devices for driving the feed roll 30, such as gears or sprockets. A linking element, in this example a belt 54, links the drive pulley 50 and the feed roll 30. In other examples, the linking element may be unnecessary, or may take another form that links the drive element with the feed roll 30. In this example, the belt 54 is configured to be provided with slack for interrupting rotation of the feed roll 30, and is configured to be tensioned to drive the feed roll 30. Material 41, in this example netting, is unrolled from the material roll 39 by the feed roll 30 and passes between the feed roll 30 and a roll element, which in this example is made of steel without a resilient coating and is referred to as steel roll element 58. The steel roll element 58 directs the material through the knife mechanism 44 and toward the material feed pan 36.

The knife mechanism 44 includes a fixed knife 60, which in this example is fastened to the baler 10 in a fixed position. The fixed knife 60 includes a sharp edge for cutting the material 41. The fixed knife 60 extends across the baler 10 a distance that spans the width 74 (shown in FIG. 4), of the material 41. The knife mechanism 44 also includes a counter-knife 62 that is moveable in a generally up and down direction through operation of an actuator (not shown), such an electric linear actuator. The counter-knife 62 is configured as an angled bar extending across the baler 10 parallel to the fixed knife 60. In the view of FIG. 3, the knife mechanism 44 is shown with the counter-knife 62 moved down into a cutting position. At the cutting position, the counter-knife 62 intersects the feed path 40 of the material 41 and forces the material 41 against the sharp edge of the fixed knife 60 to be cut thereby. A brush 66 is positioned near/adjacent the steel roll element 58. The brush 66 is contacted by the material 41 during a cutting operation, and assists in directing the cut edge of the netting between the knives 60, 62 when the counter-knife 62 is moved upward and a feed cycle is initiated.

Figure 4:
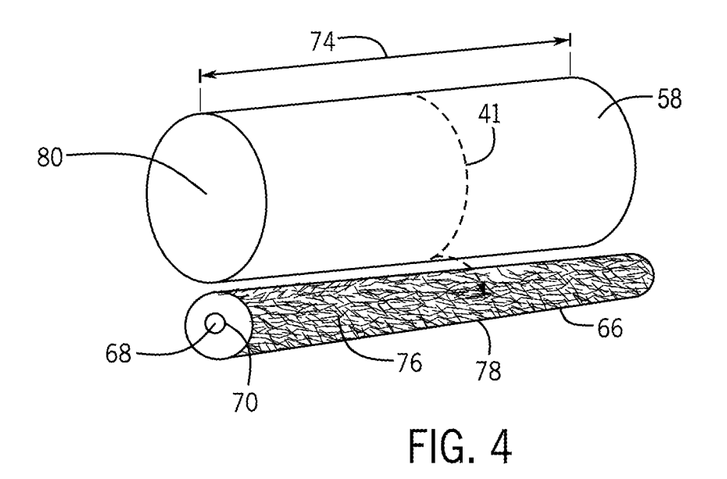
FIG. 4 is a schematic, isometric view of a brush and steel roll element of the baler of FIG. 1.

Referring additionally to FIG. 4, the brush 66 is constructed with a hollow center 68 defined by a rigid cylindrical tube 70 and is disposed adjacent the roll element 58. As shown in FIG. 3, the brush 66 is mounted on a stationary mandrel 72 configured as a rigid rod that supports the brush 66 to freely turn on the mandrel 72. A support 73 supports the mandrel 72 and is clamped or otherwise fixed against the fixed knife 60, in this example by a number of bolts. The mandrel 72 extends across the baler 10 to support the brush 66, which extends a distance at least equal to the width 74 of the material 41. Bristles 76 extend radially outward from the tube 70 along and around the brush 66 so that the outermost perimeter 78 at the tips of the bristles 76 is generally configured in a cylindrical shape. The diameter of the brush 66 is small relative to the roll element 58. In this example, the diameter across the outermost perimeter 78 is approximately 10-15 millimeter, and in some cases 13 millimeters. This relatively small size minimizes the amount of debris collected on the brush 66, and allows for fitting the brush 66 between the roll element 58 and the knife mechanism 44, while maintaining a close spacing between the two for ease of feeding across the gap. The bristles 76 are sufficiently stiff to stand upright to support, or grab the material 41, while being flexible enough to bend under the application of force such as encountered by a contact with other components of the baler 10 or solid foreign objects, while resilient to return returning to their original shape. The brush 66 is positioned between the steel roll element 58 and the knife mechanism 44. In particular, the brush 66 is positioned adjacent the steel roll element 58 lower than its center 80. In the current example, the outermost perimeter 78 does not contact the steel roll element 58 sufficiently to impart rotation to the brush 66. However, the bristles 76 are positioned close enough to (or lightly touching) the steel roll element 58 to brush off dust and debris. It should be understood that large amounts of local debris may cause the brush 66 to rotate temporarily when the steel roll element 58 rotates during a feed cycle of the material 41. The brush 66 is also positioned adjacent the knife mechanism 44 at the height 82 of the sharp tip 84 so that when the counter-knife 62 approaches the fixed knife 60, it pushes the material 41 against the brush 66 imparting rotation thereto.

In operation, as the counter-knife 62 moves in a downward motion 86, its leading leg 88 pushes the material 41 against the sharp tip 84 of the fixed knife 60 for cutting. In the same action, the counter-knife 62 forces the material 41 against the brush 66 causing the brush 66 to turn a rotation amount 90. In the current example, the rotation amount 90 is 180-degrees. Turning the brush 66 a half-revolution per cycle allows any dust or debris on top of the brush 66 to fall downward during or after the rotation cycle, and presents a clean half of the brush 66 to the oncoming netting material 41 during the next cutting cycle. After the material 41 is cut, the cut section continues through the baler 10 to wrap the bale 11 in the baling chamber 18. Following the cut, the feed roll 30 stops feeding material 41, and the counter-knife 62 moves in an upward motion 92 out of the feed path 40 to a full up position as shown in FIG. 5.

Figure 5:
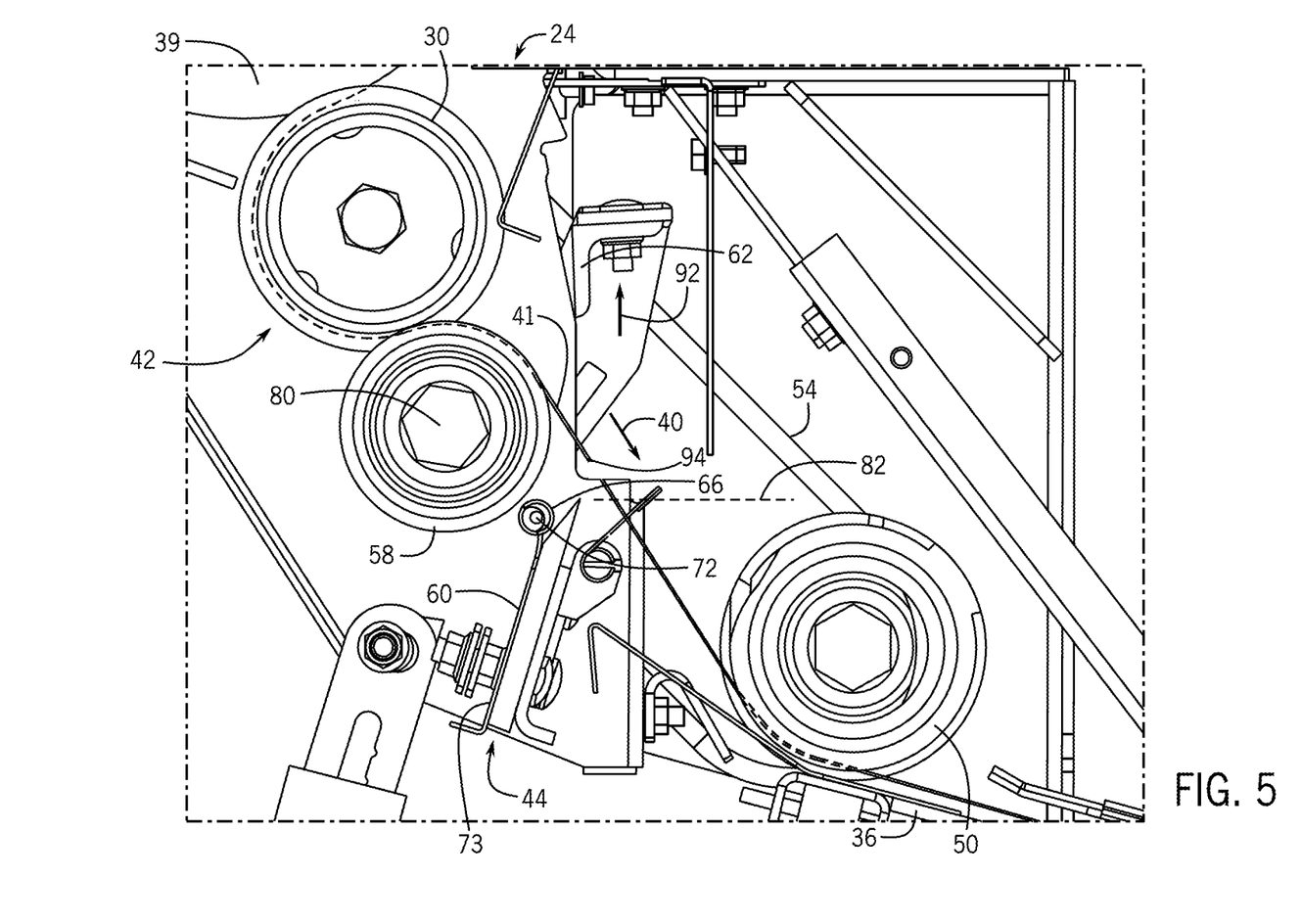
FIG. 5 is a partial end view showing the wrap material feed area of the baler of FIG. 1 with the knife mechanism in a counter-knife up position.

When the counter-knife 62 moves upward as shown in FIG. 5, the cut end 94 of the material 41 dangles from the steel roll element 58. The cut end 94 may either be supported by the brush 66 as shown in FIG. 4, or the material 41 may spring back, as shown in FIG. 5, so that the cut end 94 is directed at the feed path 40 between the fixed knife 60 and the counter-knife 62. When the cut end 94 is successfully grabbed and captured by the brush 66, it will be supported by the brush 66 ready to roll over the fixed knife 60 and down the feed path 40, once the next feed cycle is initiated. To assist in capture, the bristles 76 of the brush 66 are configured to grab or hold the material 41, as depicted in FIG. 4, and to maintain it in place for feeding over the fixed knife 60 during the next feed cycle.

Figure 6:
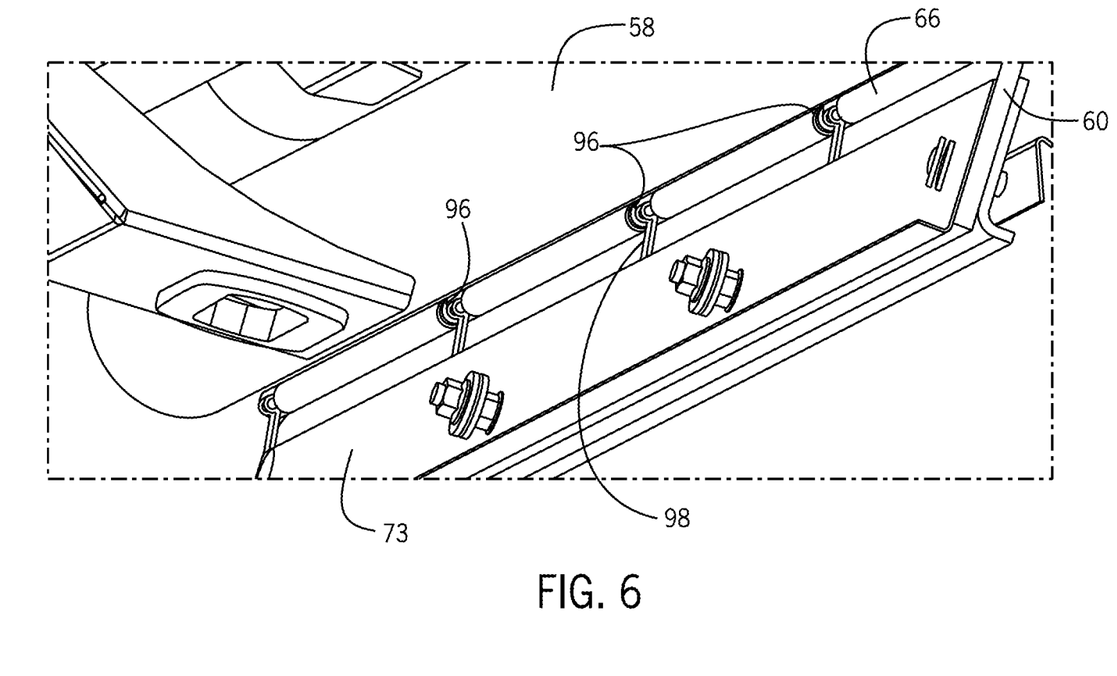
FIG. 6 is a partial isometric view showing the brush area of the wrap material feed area of the baler of FIG. 1.

Referring to the area of the brush 66 shown in FIG. 6, the brush 66 extends along the roll element 58 and is supported in place by the support 73. The support 73 is fastened against the fixed knife 60 and includes a number of extending fingers 98 that wrap around and hold the tube 70 in place. The bristles 76 of the brush 66 are omitted at areas that register with the fingers 98, providing gaps 96 within which the fingers 98 are disposed. In other examples, the tube may extend across the width 74 of the material 41 with end supports only, so that the bristles 76 are along the entire length of the brush 66.

Through the material wrap system described herein, a cylindrical brush is disposed between the material feed rolls and the knife mechanism of a baler. The brush helps guide the material through its feed path and rotates when contacted by the material during a cutting operation, for self-cleaning functions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A system for wrapping a material around a bale in a baler, comprising:
   a feed system configured to direct the material through a feed path;
   a knife mechanism including a fixed knife and a counter-knife configured to alternately move between a cutting position in which the counter-knife intersects the feed path to cut the material and a retracted position in which the counter-knife is out of the feed path;
   wherein the feed system includes a roll element configured to direct the material between the fixed knife and the counter-knife when the counter-knife is moved out of the feed path into the retracted position;

a cylindrical mandrel disposed between the roll element and the knife mechanism, the mandrel being in a stationary position relative to the fixed knife and extending along the length of the roll element; and a cylindrical brush mounted on the mandrel;

wherein, when the counter-knife is in the retracted position, the brush is positioned to contact the roll element at a location removed from the material to remove debris from the roll element without being rotated by the roll element itself; and wherein, when the counter-knife is in the cutting position, the brush is freely rotatable and the material is pressed by the counter-knife against the brush to rotate the brush to remove debris from the brush.

2. The system of claim 1, wherein the brush is configured to intersect the feed path and to rotate when the material is cut by the knife mechanism.

3. The system of claim 2, wherein the brush is configured to assist in directing the material between the fixed knife and the counter-knife when the counter-knife is moved out of the feed path.

4. The system of claim 1, wherein the material has a width normal to the feed path and wherein the brush extends along the width, in its entirety.

5. The system of claim 1, further comprising:
a material roll in which the material is contained; and
a feed roll configured to feed the material from the material roll and into the feed path, wherein the material is fed between the feed roll and the roll element.

6. The system of claim 1, comprising:
a material roll in which the material is stored, the roll element receiving the material from the material roll; and
a baling chamber configured to form the bale, and into which the material is fed to wrap the bale.

7. The system of claim 1, wherein the brush has bristles extending radially around the brush.

8. A system for wrapping a material around a bale in a baler, comprising:
a feed system configured to direct the material through a feed path, the feed system including a roll element;
a knife mechanism configured to selectively move between a cutting position in which the knife mechanism intersects the feed path to cut the material forming a cut end of the material and a retracted position in which the knife mechanism spaced apart from the roll element a distance through which the cut end is fed by the feed system through the knife mechanism without cutting the material;
a cylindrical mandrel disposed between the roll element and the knife mechanism, the mandrel being in a stationary position relative to the roll element and extending along the length of the roll element; and
a cylindrical brush mounted on the mandrel;
wherein, when the knife mechanism is moved into the cutting position, the brush is freely rotatable and configured to rotate intermittently by movement of the material when the knife mechanism cuts the material such that debris is removed from the brush;
wherein, when the knife mechanism is in the retracted position, the brush is configured to direct the cut end through the knife mechanism when the material is fed by the feed system and further positioned to contact the roll element to remove debris from the roll element without being rotated by the roll element itself.

9. The system of claim 8, wherein the brush is configured to intersect the feed path and to contact the material when the material is cut by the knife mechanism.

10. The system of claim 8, wherein the brush is configured to rotate approximately 180-degrees each time the material is cut by the knife mechanism.

11. The system of claim 8, further comprising:
a material roll in which the material is contained; and
a feed roll configured to feed the material from the material roll and into the feed path, wherein the material is fed between the feed roll and the roll element.

12. The system of claim 8, comprising:
a material roll in which the material is stored, the roll element receiving the material from the material roll; and
a baling chamber configured to form the bale, and into which the material is fed to wrap the bale.

13. The system of claim 8, wherein the brush is positioned adjacent the knife mechanism so that the knife mechanism is configured to force the material against the brush, rotating the brush when the material is cut by the knife mechanism.

14. A system for wrapping a material around a bale in a baler, comprising:
a feed roll configured to intermittently feed of the material;
a roll element configured receive the material from the feed roll and to direct the material through a feed path;
a knife mechanism configured to selectively intersect the feed path in a cutting position to cut the material and configured to move out of the feed path into a retracted position for feed of the material through the knife element along the feed path;
a cylindrical mandrel disposed between the roll element and the knife mechanism, the mandrel being in a stationary position relative to the knife mechanism and extending along the length of the roll element; and
a cylindrical brush disposed between the roll element and the knife mechanism and mounted on the mandrel to rotate on or with the mandrel, the brush extending adjacent to, and along, the roll element such that brush removes debris from the roll element without being rotated by the roll element itself;
wherein, when the knife mechanism moves into the cutting position, the brush is freely rotatable and configured to rotate by movement of the material when the knife mechanism intersects the feed path to clean the material and the roll element;
wherein, when the knife mechanism is in the retracted position, the brush is configured to direct the material from the roll element and through the knife mechanism during feed of the material by the feed roll.

15. The system of claim 14, wherein the feed path is routed above the brush and wherein the brush is positioned adjacent the knife mechanism so that the counter-knife is configured to force the material against the brush when moving into the cutting position.

* * * * *